United States Patent
Niccolini et al.

(10) Patent No.: US 9,203,857 B2
(45) Date of Patent: Dec. 1, 2015

(54) METHOD AND SYSTEM FOR DETECTING ANOMALY OF USER BEHAVIOR IN A NETWORK

(75) Inventors: Saverio Niccolini, Heidelberg (DE); Maurizio Dusi, Heidelberg (DE); Christian Vitale, Stiava (IT)

(73) Assignee: NEC EUROPE LTD., Heidelberg (DE)

( * ) Notice: Subject to any disclaimer, the term of this patent is extended or adjusted under 35 U.S.C. 154(b) by 0 days.

(21) Appl. No.: 14/342,150

(22) PCT Filed: Aug. 10, 2012

(86) PCT No.: PCT/EP2012/065747
§ 371 (c)(1),
(2), (4) Date: Apr. 9, 2014

(87) PCT Pub. No.: WO2013/029968
PCT Pub. Date: Mar. 7, 2013

(65) Prior Publication Data
US 2014/0215612 A1    Jul. 31, 2014

(30) Foreign Application Priority Data
Aug. 30, 2011 (EP) .................................. 11007035

(51) Int. Cl.
*G06F 11/00* (2006.01)
*H04L 29/06* (2006.01)

(52) U.S. Cl.
CPC ........ *H04L 63/1425* (2013.01); *H04L 63/1416* (2013.01); *H04L 2463/141* (2013.01)

(58) Field of Classification Search
CPC .................... H04L 63/1425; H04L 63/1416
USPC ........................................................ 726/22
See application file for complete search history.

(56) References Cited

U.S. PATENT DOCUMENTS

| | | | |
|---|---|---|---|
| 2005/0091532 A1* | 4/2005 | Moghe | 713/201 |
| 2006/0069912 A1 | 3/2006 | Zheng et al. | |
| 2009/0300769 A1* | 12/2009 | Srinivasa et al. | 726/26 |

OTHER PUBLICATIONS

Mohammad et al.: "A PCA-based distributed approach for intrusion detection in wireless sensor networks", Computer Networks and 01 STRI BUTEO Systems (CNDS), 2011 International Symposium on, IEEE, Feb. 23, 2011 , pp. 55-60, XP031864566, 001: 10.1109/ CNDS.2011.5764585 ISBN: 978-1-4244-9153-7 p. 56: chapter III. Problem Definition p. 57, left column: chapter A. Training Phase p. 58, left column, lines 1-11 ; equation (13) figure 3, cited in ISR.
International Search Report, dated Dec. 7, 2012, from corresponding PCT application.

* cited by examiner

*Primary Examiner* — Teshome Hailu
(74) *Attorney, Agent, or Firm* — Young & Thompson

(57) ABSTRACT

A method and system for detecting anomaly of user behavior in a network with a hierarchical topology, including a plurality of users, at least two bridges to each of which at least one user is connected to and wherein the bridges are configured to be operable to connect the corresponding users to the network, and at least one predetermined profiling network entity, the method includes the steps of:
  a) determining common behaviors of the users connected to the respective bridges;
  b) transmitting the determined common behaviors to the profiling network entity;
  c) determining an overall profile based on the transmitted common behaviors;
  d) transmitting back the determined overall profile to the bridges; and
  e) detecting anomaly of user behavior of the users connected to the corresponding bridges based on the overall profile.

12 Claims, 2 Drawing Sheets

METHOD AND SYSTEM FOR DETECTING ANOMALY OF USER BEHAVIOR IN A NETWORK

The present invention relates to a method for detecting anomaly of user behavior in a network with a hierarchical topology, comprising a plurality of users, at least two bridges to each of which at least one user is connected to and wherein the bridges are configured to be operable to connect the corresponding users to the network, and at least one predetermined profiling network entity.

The present invention also relates to a system for detecting anomaly of user behavior in a network with a hierarchical topology, comprising a plurality of users, at least two bridges to each of which at least one user is connected to and wherein the bridges are configured to be operable to connect the corresponding users to the network, and at least one predetermined profiling network entity.

Although applicable in general to networks the present invention will be described with regard to a voice over IP (VoIP) network.

Conventional networks in particular VoIP networks are commonly designed according to a hierarchical topology where so-called point of presences (POP) are the bridges between (end) users and the overall network infrastructure, for example servers in the internet. Such a hierarchical topology allows for scalability as the number of users and the volume of traffic within the network increases. To tackle problems in the network such as the detection of attackers, conventional anomaly detection techniques, like clustering and statistical-based techniques require a central node collecting information about all the users. Such information may include call durations and call rates in a voice over IP network.

The central node states whether or not an anomaly is present within a given time frame only by regularly collecting information from all users. A comparison of data traffic between the previous and current time frames enables to determine a change in the traffic. This traffic change is then used as an indicator of a present anomaly.

Figure 1:
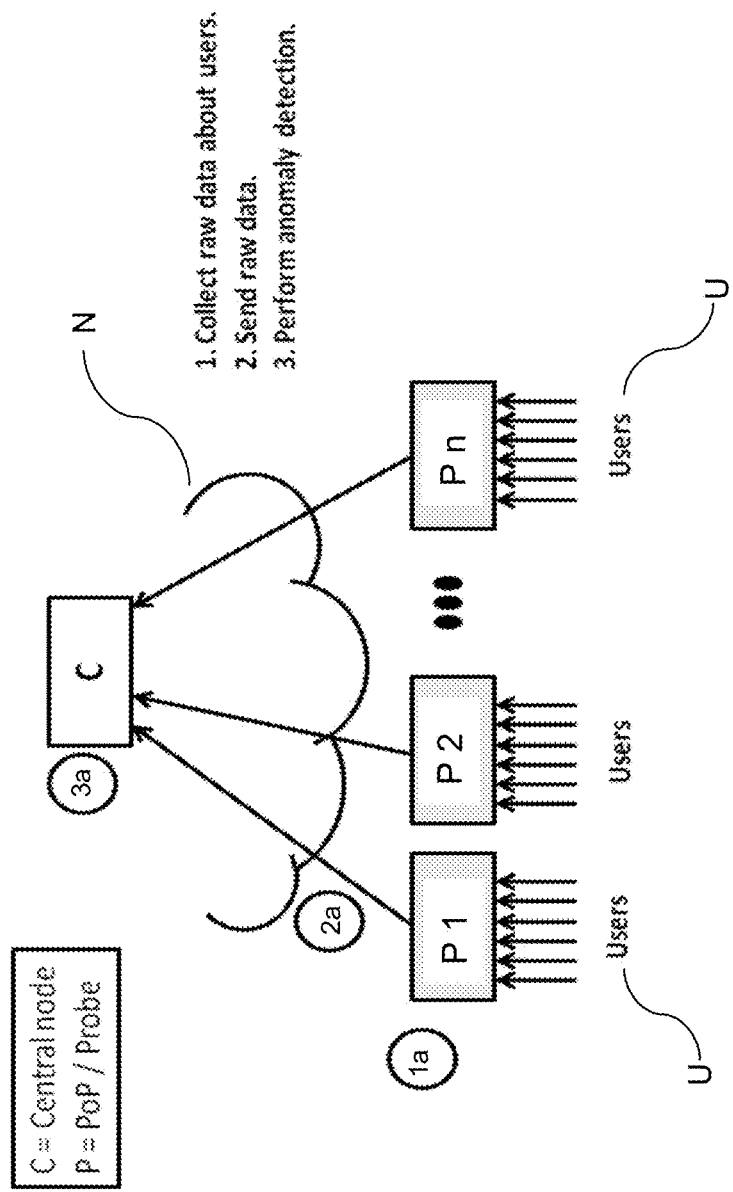

In FIG. 1 a conventional system for detecting an anomaly of user behavior in a network with a hierarchical topology is shown. In FIG. 1 a plurality of users U is connected to different points of presences P1, P2, ... Pn such that a user U is only connected to a single point of presence P1, P2, ... Pn. Via the point of presences P1, P2, ... Pn the users U are connected to the network N. The network N further comprises a central node C for collecting information from all users U. The conventional method for detecting an anomaly is as follows: In a first step 1a the central node C collects raw data about the users U from the different point of presences P1, P2, ... Pn. On this request 1a the point of presences P1, P2, ... Pn send in a next step 2a the collected raw data to the central node C. The central node C then performs an anomaly detection based on the received raw data from the different point of presences P1, P2, ... Pn.

However, anomalous behaviors of users U when aggregated together may negatively bias or influence anomaly detection performed by the central node C: An aggregation of anomalies of the same type that are initially distributed over a few point of presences affects the detection of outliers at the central node C: Said anomalies may become widespread when aggregated and automatically evaluated by the central node C: They are consequently included as part of the normal-user behavior.

For example conventional approaches may consider an activity of telemarketers insisting on a few point of presences as part of the normal-user behavior when all the data are evaluated at the central node, thus leaving them undetected. Furthermore, conventional anomaly detection methods are insecure and do not allow for scalability. A further disadvantage is that huge amounts of data have to be transferred.

Further conventional methods are shown in L. Huang, X. Nguyen, M. Garofalakis, M. Jordan, A. D. Joseph, N. Taft "Distributes PCA and Network Anomaly Detection", Tech. Report, 2006 and P. Chhabra, C. Scott, E. D. Kolaczyk, M. Crovella, "Distributed Spatial Anomaly Detection", INFOCOM, 2008.

In the first non-patent literature of L. Huang, X. Nguyen, M. Garofalakis, M. Jordan, A. D. Joseph, N. Taft, "Distributes PCA and Network Anomaly Detection", Tech. Report, 2006 an overview of the state-of-the-art approaches for anomaly detection through PCA is provided and a method is proposed that can help reducing the amount of data being exchanged between the probes and the monitoring point. However, the anomaly detection phase is still completely centralized. In the document an initial stage is considered where the probes send the raw data at the central node, which derives a snapshot of the network in a given time-series. During the next time-series, probes evaluate the subset of raw data that must be sent to the central node to update the current snapshot of the network, based on a stochastic matrix perturbation approach. In the document a detection of a single anomalous flow or call is thus provided and a tradeoff between the loss in detection accuracy at the central node and the frequency of updates sent by probes is considered.

In the second non-patent literature of P. Chhabra, C. Scott, E. D. Kolaczyk, M. Crovella, "Distributed Spatial Anomaly Detection", INFOCOM, 2008 the problem of distributed anomaly detection at the network probes is considered. The method shown therein relies on each probe performing its own anomaly detection on single flows and sending the raw data related to the outliers to their neighbours. An adjacent-neighbour filtering algorithm then produces a set of consensus anomalies. This proposed solution suffers from a major problem: widespread anomalies concentrated within a probe would not be detected, as they would be part of the community that composes the normal, i.e. non-malicious traffic at the probe side, i.e., they would pollute the profile of the normal users. Another disadvantage or side effect is that the profile of the users derived by each probe would be different from probe to probe, due to the lack of global knowledge, and so comparing the anomalies can become a guessing game.

It is therefore an objective of the present invention to provide a method and a system for detecting anomaly of user behavior in a network with hierarchical topology with reduced data traffic.

It is a further objective of the present invention to provide a method and a system for detecting anomaly of user behavior in a network with hierarchical topology enabling a more precise detection of an anomaly of user behavior.

It is an even further objective of the present invention to provide a method and a system for detecting anomaly of user behavior in a network with hierarchical topology which are privacy preserving.

Furthermore it is a further objective of the present invention to provide a method and a system for detecting anomaly of user behavior in a network with hierarchical topology which provide profiles of user behavior which are more stable over time.

According to the invention the aforementioned objections are accomplished by a method of claim 1 and a system of claim 9.

According to claim 1 the method for detecting anomaly of user behavior in a network with a hierarchical topology, comprising a plurality of users, at least two bridges to each of which at least one user is connected to and wherein the bridges are configured to be operable to connect the corresponding users to the network, and at least one predetermined profiling network entity.

According to claim 1 the method in characterized by the steps of a) Determining common behaviors of the users connected to the respective bridges, b) Transmitting the determined common behaviors to the profiling network entity c) Determining an overall profile based on the transmitted common behaviors d) Transmitting back the determined overall profile to the bridges and e) Detecting anomaly of the user behavior of users connected to the corresponding bridges based on the overall profile.

According to claim 9 the system for detecting anomaly of user behavior in a network with a hierarchical topology, comprising a plurality of users, at least two bridges to each of which at least one user is connected to and wherein the bridges are configured to be operable to connect the corresponding users to the network, and at least one predetermined profiling network entity.

According to claim 9 the system is characterized in that the bridges are configured to be operable to determine common behaviors of the users connected to the respective bridges and to transmit the determined common behaviors to the profiling network entity that the predetermined profiling network entity is configured to be operable to determine an overall profile based on the transmitted common behaviors and to transmit back the determined overall profile to the bridges, and that the bridges are configured to be operable to detect anomaly of user behavior of the users connected to the corresponding bridges based on the overall profile.

According to the invention it has first been recognized that by shipping directly at each point of presence or bridge the task of determining common behaviors of users enables a more precise determination of a detection of anomalies of user behaviors.

According to the invention it has further been first recognized that data exchange between the bridges and the predetermined profiling network entity is reduced thus saving bandwidth. Further, privacy of the individual users of each of the bridges is preserved.

According to the invention it has further been first recognized that anomalies which are localized within a few of the bridges are not becoming widespread.

According to the invention it has further been first recognized that user behavior profiles are more stable over time and space, i.e. across different bridges.

According to the invention it has further been first recognized that the method and the system are robust to the adding and/or a failure of bridges: Any bridge joining the network may fetch profiles for user behavior from the predetermined profiling network entity and starting to contribute to update the determined overall profile by sending the common behavior of users connected to the new bridge.

Further advantages, features and preferred embodiments are described in the following subclaims.

According to a preferred embodiment step a) is performed by machine learning techniques, preferably principle component analysis. One of the advantages of in particular principle component analysis is, that a set of observations of possibly correlated variables is converted into a set of values of linearly uncorrelated variables, i.e. allowing for example to determine an overall profile based on the transmitted common behaviors more easily by dividing the transmitted behaviors into normal and anomalous parts. Therefore, common behavior of users can be provided in an easy and efficient way.

According to a further preferred embodiment step c) is performed by majority voting schemes and/or clustering algorithms, preferably agglomerative hierarchical clustering. This provides an efficient way to determine an overall profile based on the transmitted common behaviors when using in particular agglomerative hierarchical clustering, used to identify communities by using similarities and dissimilarities between data sets. For example in combination with the principle component analysis each bridge may compute its principal components according to the principle component analysis based on the portion of users the bridge has visibility on and sends the principle components to the predetermined profiling network entity. The predetermined profiling network entity then compares all principle components and applies the agglomerative hierarchical clustering algorithm to identify communities of probes. A community includes probes which exhibit similar principle components. In such a way the predetermined profiling network entity can identify two kinds of community, i.e. a community containing non or sparse anomalies and a community containing one or more widespread anomalies. It is assumed that the community containing non or sparse anomalies represents the biggest community and contains the common profile of the behavior of the users. Therefore the predetermining profile network entity determines the overall profile based on the community containing non or sparse anomalies: For example the profiling network entity performs a principle component analysis on users belonging to the community containing non or sparse anomalies to compute the distributed principle components. This computation is possible as the bridges sent to the profiling network entity information such as a covariance matrix of the users and a number of users that they serve. Each bridge may then exploit profiles based on the distributed principle components to detect and remove anomalies even the ones that are widespread into the probe.

According to a further preferred embodiment the bridges disseminate their determined common behavior to other bridges so to provide a plurality of profiling network entities. One of the advantages is that each bridge acts then as profiling network entity enabling each bridge to determine an overall profile based on the transmitted common behaviors. This enhances the flexibility of the method even further since different bridges may use different determining algorithms for the overall profile.

According to a further preferred embodiment the common behaviors are reduced to a corresponding compact representation for steps b)-e). This further reduces data traffic necessary for performing steps b)-e) between the bridges and the profiling network entity.

According to a further preferred embodiment step c) includes the step c1) of identifying two groups wherein the first group corresponds to profiles with non or sparse anomalies and wherein the second group corresponds to profiles with more or widespread anomalies. This enables a fast and at the same time sufficiently precise determination of an overall profile by dividing the common behaviors of users into two groups wherein one group represents profiles of user behavior with non or sparse anomalies.

According to a further preferred embodiment step e) is performed with meta-information, preferably aggregated information about the users corresponding to the bridges. One of the advantages is that no critical information about a single user is transmitted when using meta-information therefore enhancing security for the users.

According to a further preferred embodiment the common behaviors are determined based on values and fields of an accounting-like representation. This even further enhances the detection of anomalies of user behavior, in particular determining in common behaviors of users connected to the respective bridges. Accounting-like representations are easily accessible, for example Call Detail records in a telephone network.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawings FIG. 1 shows a conventional method for detecting anomaly of user behavior in a network with a hierarchical topology; and FIG. 2 shows an embodiment of a method according to the present invention.

FIG. 1 shows a conventional method for detecting anomaly of user behavior in a network with a hierarchical topology.

In FIG. 1 a conventional system for detecting an anomaly of user behavior in a network with a hierarchical topology is shown. In FIG. 1 a plurality of users U is connected to different points of presences P1, P2, ... Pn such that a user U is only connected to a single point of presence P1, P2, ... Pn. Via the point of presences P1, P2, ... Pn the users U are connected to the network N. The network N further comprises a central node C for collecting information from all users U. The conventional method for detecting an anomaly is as follows: In a first step 1a the central node C collects raw data about the users U from the different point of presences P1, P2, ... Pn. On this request 1a the point of presences P1, P2, ... Pn send in a next step 2a the collected raw data to the central node C. The central node C then performs an anomaly detection based on the received raw data from the different point of presences P1, P2, ... Pn in a third step 3a.

Figure 2:
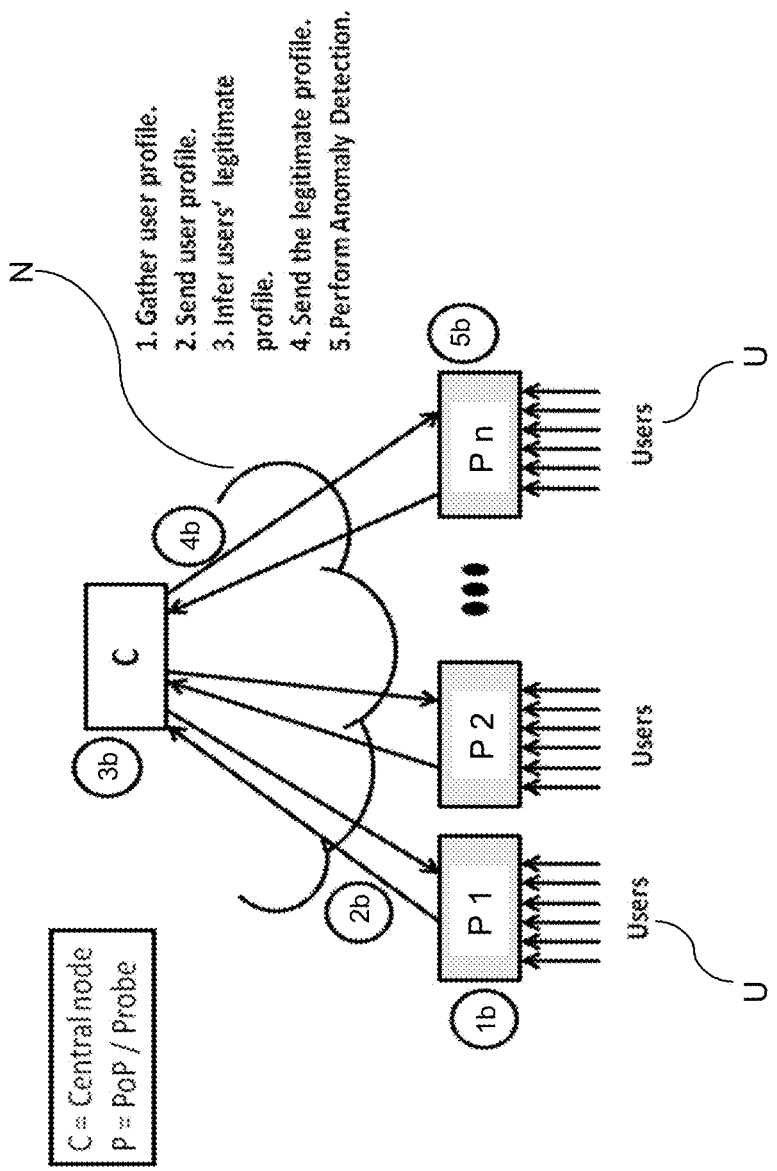

FIG. 2 shows an embodiment of a method according to the present invention.

According to FIG. 2 the following steps are performed:
1b. Each point of presence or bridge gathers a description of the portion of users U it has visibility on. The description is a compact representation of the common behavior of the users that access the network through the point of presence or bridge;
2b. Each point of presence or bridge sends its compact representation to the central node C;
3b. The central node C automatically derives the profile that best represent the traffic seen by the majority of the point of presences or bridges;
4b. The central node C distributes back the selected profile to the point of presences or bridges;
5b. Each point of presence or bridge can perform outlier detection of its users U based on the profile that has been inferred:
  i. from the knowledge of the whole users U in the network;
  ii. by exchanging between nodes only aggregate information about users, i.e., without actually transferring any critical information about the single user U.

In summary each point of presence or probe gathers a description of a normal subspace, i.e. the point of presence computes the principle components based on a set of users it has visibility on and sends such description to the central node C. The central node C then applies preferably an AHC algorithm to identify a community with non or sparse anomalies including information such as a covariance matrix and a number of users under observation by each bridge. A computation of this information is however included in the steps of getting the principal components, when the covariance method is used. The description of the legitimate-user profile is gathered from the community with non or sparse anomalies. Eventually the central node C distributes back the legitimate-user profile to the point of presences which can perform anomaly detection within their subset of users U, i.e. the users U connected to.

A computing of the principle components may be performed in the following way: A principle component analysis converts a set of observations of possibly correlated features into a set of values of uncorrelated features, i.e. the principle components. The number of principle components is equal to the number of original features with the first components able to describe most of the energy of the data named the normal subspace. If a set of X users and N features related to each user, each point of presence POP performs a principle component analysis PCA on the matrix $Q=X\times N$ and gathers the description of the normal and anomalous user behaviors. The covariance method to compute the principle components may be used and the cumulative percentage of the total variation method may be used to chose the number of principle components describing the normal subspace. As a result the principle component analysis provides each probe with its own description of the normal subspace and the description of the anomalous subspace. The point of presences or probes then send them to the central node C.

The central node C then identifies a community which encloses the description of legitimate-users, preferably to an agglomerative hierarchical clustering (AHC) algorithm. The AHC algorithm creates a hierarchy of clusters which may be represented in a tree structure following a bottom-up approach. The "leaves" of the tree correspond to each individual point of presence or bridge and the "root" of the tree includes a single cluster containing all point of presences. The algorithm starts from the "leaves" and successively a series of merging operations follow that eventually forces all points of presences or bridges into the same cluster. The choice of which clusters to merge is determined via a linkage criterion which is a function of pair wise distances between observations. The distance may be determined by Euclidean distance metric. The central node C may compute mutual Euclidean distances between the principle components of one bridge towards the principle components of all other bridges. To take into account components that count for the majority of the variance in the description of normal user behavior components may be weighted. After the central node C has computed the distances between all bridges the AHC algorithm aggregates into one cluster the pair of probes exhibiting a minimum mutual distance. The AHC algorithm iterates until one of the following conditions is reached:
 a) The mutual Euclidean distance between clusters is over a given threshold S or
 b) All probes are grouped into one single cluster.

The threshold S may be set as the average of the minimum Euclidean distance between a given probe towards the other.

As a result the AHC algorithm provides a cluster representing the community with non or sparse anomalies and which contains the majority of bridges. The remaining probes belong to the community having more or widespread anomalies.

A description of the legitimate-user profile corresponds to the normal subspace obtained when the principle components of the set of users belonging to the community with non or sparse anomalies are computed. To achieve the results more quicker with the AHC algorithm the computation of the principle components of a matrix may be parallelized on different processors and/or computers. The central node C then distributes back the principle components of the community with non or sparse anomalies together with the value of the threshold S so that a cross-check of the profile being gathered may be performed.

Before performing step e) each probe or bridge may check whether the profile received actually corresponds to the one of legitimate-users.

To prevent that the community with non or sparse anomalies comprises an anomaly being widespread through the bridges polluting the user profile, each probe or bridge belonging to the community with more or widespread anomalies checks the profile received from the profiling network entity C in the following way: The corresponding users of the probe or bridge are mapped onto the received profile from the profiling network entity C. The users U are sorted by their energy in the anomalous subspace. After sorting, the user U with the highest energy is discarded and new principle components are computed. If the Euclidean distance between the principle components newly computed and the principle components of the community with non or sparse anomalies are greater than the threshold then again the user U with the highest energy is discarded and again new principle components are computed. And again the Euclidean distance is checked if being greater or below the threshold S. If the principle components newly computed and the principle components of the community with non or sparse anomalies are below the threshold the joining to the community with non or sparse anomalies is performed.

In case that the profiling network entity C gathers a "polluted" profile, i.e. the community with non or sparse anomalies contains widespread anomalies the probe or bridge without that kind of anomaly is not able to obtain new principle components satisfying that the Euclidean distance is below the threshold S. At the end the bridges transmit a message to the profiling network entity C whether or not they were able to join the community with non or sparse anomalies. In case of a failure the profiling network entity C determines the next-largest community as the community with non or sparse anomalies sends it to the probes or bridges which repeat the above mentioned joining phase. In case the joining is not yet successful the profiling network entity C may increase the threshold S and repeat again the procedure until all probes or bridges report a positive feedback about the legitimate user profile.

To detect an anomaly each probe maps its subset of users onto the legitimate-user profile and computes their energy in the anomalous subspace. This operation is corresponding to the square prediction error for each user comparing it with a threshold which may be bridge-dependent. Users with a square prediction error greater than the threshold value are determine as outliers and discarded as anomalous.

If the above mentioned joining phase initially fails then the threshold may be set too strict or the AHC algorithm may return a wrong community. If the threshold is set to strict this leads to an over-fitting of the profile whether profile is described by the community with non or sparse anomalies does not include a complete snapshot of how the users in a network behave. If the AHC algorithm returns a wrong community this may be related to the presence of widespread anomalies distributed over bridges affecting their principle components. In this case bridges without such anomaly will not be able to reach a description of the normal subspace such as the one of the community with non or sparse anomalies.

In summary the present invention allows to automatically profile a behavior of non-malicious users within a network, producing long-term profile of users, stable over time and space, i.e. across the point of presences, and a hot-swap mechanism of outlier detection in case of a point of presence failure. The present invention uses the hierarchical topology of the network itself to gain profiles of non-malicious users of the network. Any sensible data about single users does not have to be exchanged and any kind of traffic being exchanged over the network may be used to define automatically profiles without the need of any a priori definition what non-malicious traffic is. The present invention describes information about users in a compact way and let a central node to apply community detection/majority voting schemes to gather users profiles. Outlier detection is decentralized to the different point of presences. Further the present invention neutralizes the effect of widespread anomalies which are localized within few points of presences.

The present invention has the following advantages: First the present invention can detect users responsible for widespread anomalies that are localized within a few points of presences. Further the present invention leads to a definition of a profile which is stable over time since it describes in a compact way how normal users make use of the network. A further advantage is that the present invention processes and exchanges aggregated information about users leading to preserving of privacy and to a reduction of bandwidth consumption. Further the present invention is robust to the adding and failure of point of presences as it is suitable in a cloud network environment. Any point of presence joining the network may fetch the profile from the profiling network entity and start contributing to updating the profile itself. Further a revealing of sensible information about users to derive a definition of a profile is not necessary. Furthermore the present invention enables a better detection of anomalies which are related to few points of presences only such as the set up of a botnet of telemarketers within a point of presence.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for detecting anomaly of user behavior in a network with a hierarchical topology, the method performed with a memory available to a computing device comprising at least two bridges to each of which at least one user (U) is connected to and wherein the bridges (P1, P2, . . . Pn) are configured to be operable to connect the corresponding users (U) to the network, and at least one predetermined profiling network entity (C), which method comprises the steps of:
 a) said bridges determining (1b) common behaviors of the users (U) connected to the respective bridges (P1, P2, . . . Pn), b) said bridges transmitting (2b) data of said determined common behaviors to the profiling network entity (C), c) said profiling network entity determining (3b) an overall profile based on the transmitted common behaviors, d) said profiling network entity transmitting back (4b) data of said determined overall profile to the bridges (P1, P2, . . . Pn), and e) the corresponding brides detecting (5b) anomaly of user behavior of the users (U) connected to the corresponding bridges (P1, P2, . . . Pn) based on the overall profile, wherein a new bridge, when joining the network, fetches profiles for user behavior from said profiling network entity and starts to update the determined overall profile by sending the common behaviors of users connected to said bridge.

2. The method according to claim 1, wherein in step a) and/or in step c) machine learning techniques are performed.

3. The method according to claim 1, wherein step c) is performed by majority voting schemes and/or clustering algorithms.

4. The method according to claim 1, wherein the bridges (P1, P2, . . . Pn) disseminate their determined common behavior to other bridges so to provide a plurality of profiling network entities (C).

5. The method according to claim 1, wherein the common behaviors are reduced to a corresponding compact representation for steps b)-e).

6. The method according to claim 1, wherein step c) includes the step c1) of identifying two groups wherein the first group corresponds to profiles with none or sparse anomalies and wherein the second group corresponds to profiles with more or widespread anomalies.

7. The method according to claim 1, wherein step e) is performed with meta-information.

8. The method according to claim 1, wherein the common behaviors are determined based on values and fields of an accounting-like representation.

9. The method according to claim 1, wherein in step a) and in step c) machine learning techniques, including principal component analysis, are performed.

10. The method according to claim 1, wherein step c) is performed by majority voting schemes and/or clustering algorithms, including agglomerative hierarchical clustering.

11. The method according to claim 1, wherein step e) is performed with meta-information, including aggregated information about the users (U) corresponding to the bridges (P1, P2, . . . Pn).

12. A system for detecting anomaly of user behavior in a network with a hierarchical topology, said system comprising:

at least two bridges (P1, P2, . . . Pn) to each of which at least one user (U) is connected to and wherein the bridges (P1, P2, . . . Pn) are configured to be operable to connect the corresponding users to the network, and at least one predetermined profiling network entity (C), wherein, the bridges (P1, P2, . . . Pn) are configured to be operable to determine common behaviors of the users (U) connected to the respective bridges (P1, P2, . . . Pn) and to transmit data of the determined common behaviors to the profiling network entity (C), the predetermined profiling network entity (C) is configured to be operable to determine an overall profile based on the transmitted common behaviors and to transmit back data of the determined overall profile to the bridges (P1, P2, . . . Pn), and the bridges (P1, P2, . . . Pn) are configured to be operable to detect anomaly of user behavior of the users (U) connected to the corresponding bridges (P1, P2, . . . Pn) based on the overall profile data, and a new bridge, when joining the network, fetches profiles for user behavior from said profiles network entity and starts to update the determined overall profile by sending the common behaviors of users connected to said bridge.

* * * * *